UNITED STATES PATENT OFFICE.

LUDWIG PAUL, OF FÜRSTENBERG-ON-ODER, PRUSSIA, GERMANY.

PRODUCTION OF DISULPHO AND DICARBO ACIDS OF THE DIAMIDOAZO-BENZIDINES.

SPECIFICATION forming part of Letters Patent No. 380,403, dated April 3, 1888.

Application filed January 14, 1888. Serial No. 260,721. (No specimens.) Patented in Germany August 6, 1887, No. 3,397.

*To all whom it may concern:*

Be it known that I, Dr. LUDWIG PAUL, of Fürstenberg-on-Oder, Kingdom of Prussia, in the German Empire, have invented certain new and useful Improvements in the Production of Disulpho and Dicarbo Acids of the Diamido-azo-Benzidines, of which the following is a full, clear, and exact description.

My invention relates to the production of disulpho and dicarbo acids of the diamidoazo-benzidines. The disulpho or dicarbo acids of the diamidoazo-benzidines are formed by the reaction of tetrazo diphenyl, ditolyl, or dixylyl upon, at first, one molecule meta or para sulphanilate of soda; one molecule ortho, meta, or para amido benzoic acid; one molecule of the technical monosulpho-acids of ortho or para toluidine or the xylidines, and by the following reaction of the thus-obtained intermediate products upon a second molecule of the above-named sulpho-acids. All the reactions—first, tetrazotizing of benzidine and homologues; second, combination of the obtained tetrazo compounds with one molecule of monosulpho-acid, and, third, further combination of the intermediate product with a second molecule of a monosulpho-acid—are made in alcoholic solution, whereby my process differs exactly from others.

Example: Ten kilograms base of benzidine are dissolved in two hundred liters spirit filtered and cooled by outside cooling to about 5° Celsius. Then twenty-five kilograms hydrochloric acid are added and cooled again to about 5° Celsius. The formed grayish-white paste of chlorhydrate of benzidine is tetrazotized by the addition of a concentrated solution of six kilograms nitrite of soda, ninety-six per cent. After half an hour's rest the tetrazotization is finished and the formed tetrazo-diphenyl has precipitated in the form of a crystalline mass, which may be filtered and washed. In the same time ten kilograms seventy per cent. meta-amido-benzo sulpho-acid and twenty-five kilograms acetate of soda are dissolved in about fifty kilograms water and added to the alcoholic suspension of the tetrazo-diphenyl. Under a rapid reaction the monosulpho-acid of the monoamido-benzidine,

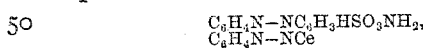

is formed in form of yellowish-red little leaves. After a rest of half an hour the new body is filtered and suspended again in about two hundred and fifty liters spirit. Then a most concentrated solution of ten kilograms meta-amido-benzol sulpho-acid, seventy per cent., and thirty to forty kilograms carbonate of soda is slowly added. The mixture is allowed to rest about six hours at 50° Celsius. After this it is filtered and the filtered liquid mixed with a diluted solution of common salt. The thus-obtained precipitate,

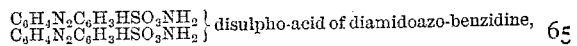 disulpho-acid of diamidoazo-benzidine, is filtered, sucked off, and dried. It dyes cotton from alkaline bath very bright greenish-yellow.

In quite the same way the homologue coloring-matters are obtained by replacing the benzidine by the equivalent quantities of tolidine or diamido-dixylyl, and the meta-amido-benzo sulpho-acid by the equivalent quantities of para-amido-benzo sulpho-acid, ortho, meta, or para amido-benzoic acid, or the technical sulpho-acids of ortho or para toluidine or the xylidines.

I am aware of the United States patent of Martius, No. 358,865, of March 8, 1887, claiming to have made the same reactions as above described in aqueous solutions, (example 5 of above patent,) and to have obtained by this a yellow coloring-matter; but it will be found that in aqueous solutions the reaction of tetrazo-diphenyl upon the sulpho-acids of aniline, toluidine, xylidine, and upon the carbon acids of aniline only takes place one molecule upon one molecule. It is in every case only the intermediate product which is formed—a half-ready product which contains still a free diazo group. This can be demonstrated by the following facts: First, the product obtained in following the description of Martius, in boiling it with water, evolves azote; second, with carbonate of soda azote likewise evolves under growing brown and precipitating a tarry mass; third, in combining the product obtained by working as per the description of Martius again with naphthionate there is formed—after a shaking of twelve hours—a black compound which is soluble with carbonate of soda with yellowish-red color and dyes cotton in the same red shade from alkaline bath; fourth, the product of Martius dyes a quite different shade from my product.

The product which I get in working with alcoholic solutions is soluble in hot water, also with carbonate of soda, without any change.

Naphthionate does not react upon my product.

If, now, the product of Martius dyes, notwithstanding the cotton, red yellowish, especially if much coloring-matter is taken, this is set clear, that in boiling it with water and carbonate of soda it is decomposed in the following way:

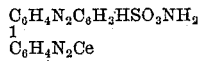

is transformed by the decomposition of the free diazo group into the hydroxyl group under evolving of azote,

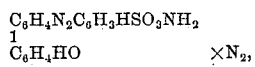

which dyes a kind of red-yellowish shade; and of course it is not denied that traces of the right disulpho-acid,

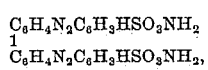

are formed, but in an even way and with the effect of a technical value, the combination of tetrazo diphenyl, ditolyl, and dixylyl with two molecules of the sulpho or carbo acids of aniline and homologues only and exclusively takes place in alcoholic solutions—i. e., by my process—which is therefore quite different from that secured by United States Patent No. 358,865, March 8, 1887.

What I claim as my invention, and desire to secure by Letters Patent, is—

The tetrazotizing of benzidine, tolidine, and diamido-dixylyl and the combination of the thus-obtained tetrazo compounds with one or two molecules of meta or para amido-benzol sulpho-acid, or ortho, meta, or para amido-benzoic acid, or the sulpho-acids of ortho or para toluidine or xylidine, in alcoholic solution, and the products thereof.

In testimony that I claim the foregoing I have hereunto set my hand, in the presence of two witnesses, this 28th day of November, 1887.

LUDWIG PAUL.

Witnesses:
CARL BORNGRAEBER,
EDWARD KEGEL.